United States Patent [19]

Ness

[11] 3,828,777

[45] *Aug. 13, 1974

[54] MICROPOROUS OCULAR DEVICE

[75] Inventor: Richard A. Ness, Fergus Falls, Minn.

[73] Assignee: Alza Corporation, Palo Alto, Calif.

[ * ] Notice: The portion of the term of this patent subsequent to Nov. 9, 1988, has been disclaimed.

[22] Filed: Nov. 8, 1971

[21] Appl. No.: 196,642

[52] U.S. Cl. ................................. 128/260, 424/19
[51] Int. Cl. .......................................... A61m 31/00
[58] Field of Search ............ 128/260, 268.2 R, 156, 128/249; 424/19, 21; 206/.5

[56] References Cited
UNITED STATES PATENTS

| | | | |
|---|---|---|---|
| 2,846,057 | 8/1958 | Polin | 206/.5 |
| 3,053,255 | 9/1962 | Meyer | 128/268 |
| 3,075,527 | 1/1963 | Bechtold | 128/260 |
| 3,220,960 | 11/1965 | Wichterle | 128/2 R X |
| 3,416,530 | 12/1968 | Ness | 128/260 |
| 3,426,754 | 2/1969 | Bierenbaum et al. | 128/260 X |
| 3,598,123 | 8/1971 | Zaffaroni | 128/268 |
| 3,618,604 | 11/1971 | Ness | 128/260 |
| 3,630,200 | 12/1971 | Higuchi | 128/260 |

Primary Examiner—Richard A. Gaudet
Assistant Examiner—J. C. McGowan
Attorney, Agent, or Firm—Thomas E. Ciotti; Edward L. Mandell; Paul L. Sabatine

[57] ABSTRACT

An ocular device for the controlled and continuous administration of a predetermined dosage of drug to the eye comprising a body of microporous drug release rate controlling material which is insoluble in tear fluid, the pores of which are filled with a medium permeable to the passage of drug by diffusion. The body contains a reservoir of drug formulation confined therein which is of limited solubility in the medium, and is of a shape which is adapted for insertion and retention in the sac of the eye bounded by the surfaces of the bulbar conjunctiva of the sclera of the eyeball and the palpebral conjunctiva of the lid. The body continuously meters the flow of a therapeutically effective amount of drug to the eye and surrounding tissues at a controlled and reproducible rate over a prolonged period of time. The device is so constructed that the metering is determined by the rate of diffusion of drug in the diffusive medium.

9 Claims, 7 Drawing Figures

INVENTOR.
RICHARD A. NESS

INVENTOR.
RICHARD A. NESS
BY
*Edward J Mandell* ATTORNEY

FIG.5

MICROPOROUS OCULAR DEVICE

BACKGROUND OF THE INVENTION

This invention relates to a device for the controlled and continuous administration of drug to the eye over a prolonged period of time.

Presently, diseases of the eye are conventionally treated by periodically applying ophthalmic drugs in liquid or ointment form. While this method of administration is suitable in certain instances, a serious shortcoming is the failure of these types of dosage formulations to dispense the drug in a continuous manner. Periodic application of these dosage forms, even though they be applied at intervals during the day and night, results in the eye receiving a massive, but unpredictable, amount of drug at each time of application. The result of this intermittent administration is that the level of drug surges to a peak at the time the drug is applied to the eye, followed by a decline in concentration. Thus, a plot of drug in the eye and surrounding tissues vs time, after administration of several dosage forms a day has the appearance of a series of peaks which may surpass the toxic threshold of the drug and valleys which fall below the critical point needed to achieve the desired therapeutic effect. Further, drug administered via an ointment or liquid form of therapy is washed away rapidly by tear fluid, leaving the eye without medication until the next application. Moreover, in some ocular conditions characterized by constant deterioration, i.e., glaucoma, continuous treatment offers extremely important therapeutic advantages. Most ointment dosage forms presently available are in unsterilized form, and are generally difficult to use without impairment of vision.

My earlier filed U.S. Pat. application, Ser. No. 831,761, filed June 9, 1969, entitled "Ocular Insert" which issued on Nov. 9, 1971 as U.S. Pat. No. 3,618,604 discloses a drug dispensing ocular insert which slowly releases drug to the eye at a controlled rate over prolonged periods of time. Such ocular device comprises a continuous and imperforate surfaced body formed of a drug release rate controlling polymeric material which is biologically inert, non-allergenic and insoluble in tear fluid. To initiate the therapeutic program, the ocular insert is placed in the upper or lower sac of the eye bounded by the surfaces of the sclera of the eyeball and conjunctiva of the lid. Since the material from which the ocular insert is formed is insoluble in tear liquid, it retains its integrity and remains intact during the course of therapy, acting as a reservoir to continuously release drug to the eye and surrounding tissues at a controlled rate. On termination of the therapeutic program the ocular insert is removed from the eye. Thus, a single such ocular insert provides the complete ophthalmic dosage regimen for a particular time period, on the order of 1 to 7 days or longer. More frequent repeated applications which are necessary with liquids or ointments are avoided. Devices containing the drug are formed, at least in part, of these homogeneous rate controlling polymeric barriers to permit passage of the drug through the body of the device at a controlled rate. In these barriers, the release rate is proportional to the diffusion coefficient in the polymer and the solubility of the drug in the polymer. Therefore, by utilizing the mechanism of diffusion, the rate of drug release from the device is controlled with precision and reproducibility since the drug has a definite and characteristic rate of passage thru the body which in effect establishes the dosage rate. In each case, selection of the rate controlling material is dependent upon the particular drug to be used in the device since the diffusivity and solubility parameters vary significantly with this factor. These drug dispensing ocular inserts have proved to be effective and a significant improvement over prior art ointments and liquids.

One difficulty with the control system described above, however, is that release rates cannot be varied with a given homogenous polymeric material other than by changing the thickness of the rate controlling material used to make the device. This often may be impractical because of size limitations presented by the ocular cavity or may, in some cases, cause fabrication difficulties wherein very thin or very thick walls are required to achieve the desired release rate. These considerations often dictate the use of a different rate controlling material for each drug to be administered in order to obtain the desired release rate from the device thereby adding considerable complexity to the manufacture of the ocular insert.

SUMMARY OF THE INVENTION

Accordingly, a primary object of this invention is to provide an ocular insert for the continuous and controlled delivery of drug to the eye employing a metering system which facilitates the obtainment of a predetermined release rate from the device.

Other objects, features and advantages of the invention will become more apparent from the following description when taken in conjunction with the drawings and from the claims.

In accomplishing these objects, one feature of this invention resides in an ocular device for the controlled and continuous administration of a predetermined dosage of drug to the eye over a prolonged period of time comprising a body of microporous drug release rate controlling material which is insoluble in tear fluid, the pores of which are filled with a medium permeable to the passage of drug by diffusion, the body containing a reservoir of drug formulation confined therein which is of limited solubility in the medium, and being of a shape which is adapted for insertion and retention in the sac of the eye bounded by the surfaces of the bulbar conjunctiva of the sclera of the eyeball and the palpebral conjunctiva of the lid, the body continuously metering the flow of a therapeutically effective amount of drug to the eye and surrounding tissues at a controlled and reproducible rate over a prolonged period of time, and wherein the device is so constructed that the metering is determined by the rate of diffusion of drug in the diffusive medium.

DETAILED DESCRIPTION OF THE INVENTION

The term "body" is used herein to define the drug containing devices of the invention and is intended to connote a class of structures capable of fulfilling the intended function and, as will be hereinafter more completely developed, includes containers having microporous walls and one or moe interior drug containing chambers, as well as microporous matrices having an active drug formulation distributed therethrough.

Use of the expression "insoluble in tear liquid" refers to suitable materials that do not dissolve and erode as a result of the action of tear liquid.

Figure 1:
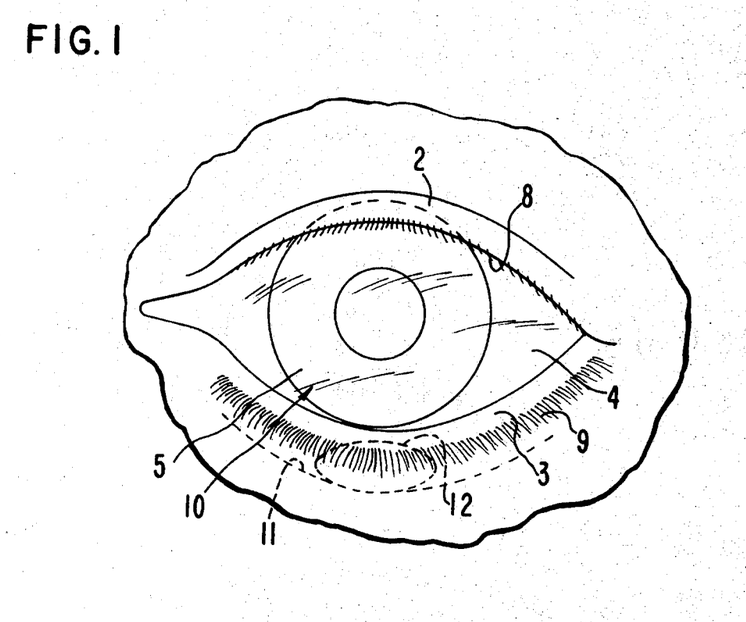
FIG. 1 is a view partly in front elevation and partly diagrammatic of a human eye, illustrating an ocular insert of this invention in an operative position after insertion in the eye.
Figure 2:
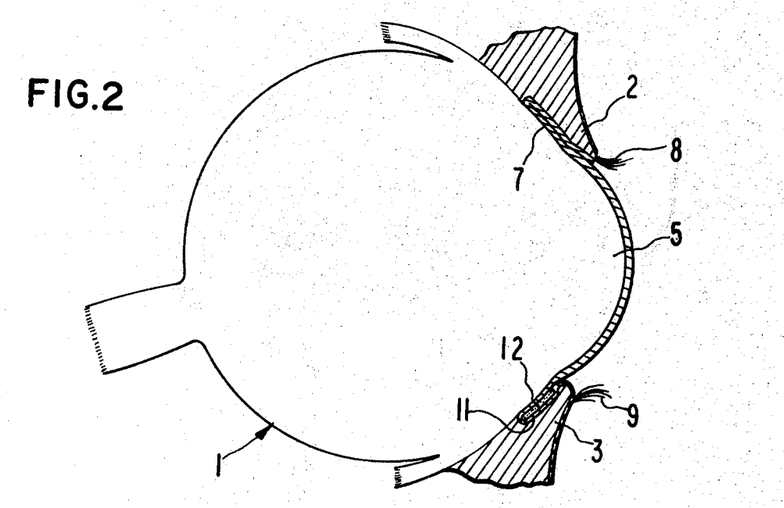
FIG. 2 is a view partly in vertical section and partly diagrammatic of an eyeball and the upper and lower eyelids associated therewith showing the ocular insert of this invention in operative position.

Referring particularly to FIGS. 1 and 2, a human eye is shown, more or less diagrammatically, as comprising an eyeball 10 and upper and lower eyelids 2 and 3, respectively, the eyeball 10 being covered for the greater parts of its area by the sclera 4 and at its central portion by the cornea 5. The eyelids 2 and 3 are lined with an epithelial membrane or palpebral conjunctiva. The sclera 4 is lined with the bulbar conjunctiva which covers the exposed portion of the eyeball. The cornea 5 is covered with an epithelial membrane which is transparent. That portion of the palpebral conjunctiva which lines the upper eyelid and the underlying portion of the bulbar conjunctiva defines the upper sac 7 and that portion of the palpebral conjunctiva which lines the lower eyelid 3 and the underlying portion of the bulbar conjunctiva defines the lower sac 11. Upper and lower eyelashes are indicated at 8 and 9, respectively.

An ocular insert 12 is shown in operative position in the lower sac 11 of the eye. Other details of the eyeball 10 are not directly concerned with the structure of the instant invention and, therefore, details showing the description thereof are being omitted in the interest of brevity. To use the ocular insert of the invention, it is inserted within the upper 7 or lower sac 11. Placement in the lower sac is preferred due to the tendency of the eye to roll upwardly during sleeping, known as Bell's phenomenon, which may cause discomfort to some patients if the insert is located in the upper sac 7. Once in place, the ocular insert 12 functions to continuously dispense a metered amount of drug from the device to the eye and surrounding tissues over a prolonged period of time through a primary drug transfer mechanism of "Permeation Control Release," i.e., the controlled release of the drug by the processes of diffusive transfer by controlled flow of drug through the microporous rate controlling material of the insert. In any event, after the drug leaves the ocular insert, it is transported to the eye and surrounding tissues, including the corneal epithalium, by the flow of tear liquid and the blinking action of the eyelids.

In the devices of the invention, the body is formed of a drug release rate controlling microporous material that is permeable to the drug by diffusive permeation through a diffusive medium present in the pores of the material. The drug molecules dissolve in the medium and flow through to a direction of lower chemical potential, i.e., to that of the receptor site. The mechanism by which diffusion is achieved may be explained on the basis of an activity or chemical potential gradient wherein the confined drug relieves its internal concentration by spreading out into the adjacent medium. As the drug is removed from the device and absorbed by eye tissues or carried away by the eye fluids, the diffusive action continues until the source of drug has been substantially consumed. The drug will have a definite and characteristic rate of passage through the diffusive medium located in the pores of the release rate controlling material of the insert. The release rate of drug can be controlled in accordance with Fick's First Law, depending on the particular design by selection of dependent variables such as the diffusivity and solubility of the drug in the diffusive medium and the thickness and porosity of the release rate controlling material properly modified by a tortuosity factor. Thus, it can be seen that the diffusive medium acts in cooperation with the drug in order to achieve a controlled drug release rate. The primary purpose of the microporous material is to form a matrix for a substantially convection-free or stagnant diffusive medium layer. There may be some small contribution to the overall drug permeability due to diffusion of drug in the supporting fraction of the matrix material, but in the devices described in this disclosure, this contribution is always small compared to diffusion in the medium-filled pores.

If the pore diameter of the microporous material is large compared to the drug molecular diameter, there is essentially no specific interaction between the drug and the matrix material and, thus, the diffusion coefficient of the drug is essentially the same as it would be in a stagnant layer of the diffusive medium. However, if the pore diameter is lees than $ca$ 10 times the molecular diameter of the drug, there will be a drug-pore interaction as described hereinafter. An important advantage of the claimed devices is therefore manifested in that the same rate controlling materials can be employed for any drug having the requisite solubility properties in the diffusive medium.

Any material having the ability to control the rate of release of drug over a prolonged period of time by the above described mechanism is herein defined as "drug release rate controlling material."

The materials suitable for fabricating the body of the device are generally those materials capable of forming microporous materials through which the drug can pass at a controlled rate of release by the process of diffusive flow. Such materials are referred to in this specification and the appended claims as "drug release rate controlling materials." Suitable materials for forming the wall are naturally-occurring or synthetic materials which are biologically compatible with the eye and surrounding tissues, and essentially insoluble in body fluids with which the device will come in contact. The use of materials soluble in eye fluids is to be avoided since dissolution will affect the constancy of the drug release. Both organic and inorganic polymeric materials can be shaped into a wide variety of forms with tailored morphology and a wide range of chemical and physical properties to advantageously control release of a wide variety of drugs and over a large dosage range by appropriate pore size and porosity selection. Additionally, by selection of the diffusive medium for impregnating the interconnected pores of the microporous structure, a given microporous material can be adapted to control the release of drugs having a wide range of chemical properties by diffusive permeability.

The microporous rate controlling materials of this invention are known in the art and can be visualized as a plurality of sponge-like fused particles which provide a supporting structure having therethrough a dispersion of microscopic sized interconnecting voids or pores. The rate controlling structures formed from the materials can be isotropic, wherein the structure is homogenous throughout the cross-section of the matrix or membrane material, or anisotropic wherein the structure is non-homogenous. These rate controlling structures are commercially available and can be made by a multitude of different methods, e.g., etched nuclear track, and different types of materials including, for example, polyelectrolyte, ion exchange polymers. These methods and materials are described in R. E. Kesting, *Synthetic Polymer Membranes*, McGraw Hill, Chapters 4 and 5, 1971; J. D. Ferry, *Ultrafiltration Membranes*, Chemical Review, Vol. 18, Page 373, 1934. Materials possessing from 5 percent to 95 percent voids and having an effective pore size of from about 10 angstroms to about 100 microns can be suitably employed in the practice of this invention. Materials with pore sizes significantly below 10 angstroms can be considered to be imperforate molecular diffusion or homogenous-type membranes and matrices. In order to obtain the most advantageous results, the materials should be formed into structures with the desired morphology in accordance with methods known to those skilled in the art to achieve the desired release rate of drug.

Materials useful in forming the microporous rate controlling materials used in this invention include, but are not limited to, the following.

Polycarbonates, i.e., linear polyesters of carbonic acids in which carbonate groups recur in the polymer chain, by phosgenation of a dihydroxy aromatic such as bisphenol A. Such materials are sold under the trade designation Lexan by the General Electric Company.

Polyvinylchlorides; one such material is sold under the trade designation Geon 121 by B. G. Goodrich Chemical Company.

Polyamides such as polyhexamethylene adipamide and other such polyamides popularly known as "nylon." One particularly advantageous material is that sold under the trade name "NOMEX" by E. I. DuPont de Nemours & Co.

Modacrylic copolymers such as that sold under the trade designation DYNEL and formed of polyvinylchloride (60 percent) and acrylonitrile (40 percent), and the like.

Polysulfones such as those of the type characterized by diphenylene sulfone groups in the linear chain thereof are useful. Such materials are available from Union Carbide Corporation under the trade designation P—1700.

Halogenated polymers such as polyvinylidene fluoride sold under the trade designation Kynar by Pennsalt Chemical Corporation, polyvinylfluoride sold under the trade name Tedlar by E. I. DuPont de Nemours & Co., and the polyfluorohalocarbon sold under the trade name Aclar by Allied Chemical Corporation.

Polychloroethers such as that sold under the trade name Penton by Hercules Incorporated, and other such thermoplastic polyethers.

Acetal polymers such as the polyformaldehyde sold under the trade name Delrin by E. I. DuPont de Nemours & Co., and the like.

Acrylic resins such as polyacrylonitrile polymethyl methacrylate, poly n-butyl methacrylate and the like.

Other polymers such as polyurethanes, polyimides, polybenzimidazoles, polyvinyl acetate, aromatic and aliphatic, polyethers, cellulose esters, e.g., cellulose triacetate; cellulose, collodion (cellulose nitrate with 11% nitrogen); porous rubber; cross-linked poly(ethylene oxide); cross-linked polyvinylpyrrolidone; cross-linked poly(vinyl alcohol); polyelectrolyte structures formed of two ionically associated polymers of the type as set forth in U.S. Pat. Nos. 3,549,016 and 3,546,142; derivatives of polystyrene such as poly(sodium styrenesulfonate) and polyvinylbenzyltrimethyl-ammonium chloride); poly(hydroxyethyl methacrylate); poly(isobutyl vinyl ether), and the like, may also be utilized. A large number of copolymers which can be formed by reacting various proportions of monomers from the aforesaid list of polymers are also useful for preparing rate controlling structures useful in the invention.

The diffusive medium suitable for use herein are those materials which are non-toxic in the eye and surrounding tissues and in which the drug has a limited solubility. This is so since it has been found that if this is not the case, i.e., the drug is not of limited solubility therein, the rate of release of drug is governed by simple dissolution of the drug in the diffusive medium which is difficult if not impossible to control. Therefore, the diffusive medium is one which enables the drug to dissolve therein and flow by diffusion at the desired rate. It can be either of a liquid or gel nature and be a poor or good solvent for the drug. A medium with poor solvent properties for the drug is desired when the required release rate is low and of course the converse is true when the desired release rate is high.

By "limited solubility" is meant that drug is soluble in given pre-selected amounts in the diffusive medium and includes solubilities such as soluble, sparingly soluble, slightly soluble, very slightly soluble, and almost practically insoluble. Generally, the term "limited solubility" comprises a range of solubility of drug in medium of from 10–5,000 parts per million on a weight basis. The above ranges are set forth to aid in defining the invention, and they should not be considered as limiting as other ranges at higher or lower temperatures are embraced within the above presentation are also included herein, depending upon the desired release rate and other controlling variable parameters discussed above. Representative materials for use as the diffusive medium include saline, glycerin, ethylene glycol, propylene glycol, water, emulsifying and suspending agents such as methyl cellulose mixed with water, mixtures of propylene glycol monostearate and oils, gum tragacanth, sodium alginate, poly(vinylpyrrolidone), polyoxyethylene stearate, fatty acids such as linoleic, silicone oil and the like. Representative mediums are set forth in *Remington's Pharamaceutical Sciences*, pages 246 to 269 and 1,338 to 1,380, 1970, published by Mack Publishing Company, Easton, Pa.

The diffusive medium can be added to the material by methods well known to the art, for example, by immersion of the material in a bath containing the diffusive medium to let the medium partially fill or fully saturate the micropores of the material. Another method for charging the micropores with a diffusive medium is to add the diffusive medium or a mixture of diffusive media with the drug formulation so that the medium can flow from within the reservoir into the pores and remain therein to permit diffusive flow of drug. In a preferred aspect, the diffusive medium is an isotonic solution such as lacrimal or tear fluid which can be incorporated into the pores of the rate controlling material by any of the previously described methods or advantageously self-incorporated by contact with the eye at the time the device is inserted in the eye, in which case these fluids are available for subsequent transfer into the micropores of the material for functioning as a diffusive medium for drug.

The ocular insert can be fabricated in any convenient shape for comfortable retention in the sac of the eye. Thus, the marginal outline of the ocular insert can be ellipsoid, donut-shape, bean-shape, banana-shape, circular, rectangular, etc. In cross-section, it can be doubly convex, concavoconvex, rectangular, etc., as the ocular insert in use will tend to conform to the configuration of the eye, the original cross-sectional shape of the device is not of controlling importance. Dimensions of the device can vary widely. The lower limit on the size of the device is governed by the amount of the particular drug to be supplied to the eye and surrounding tissues to elicit the desired pharmacologic response, as well as by the smallest sized device which conveniently can be inserted in the eye. The upper limit on the size of the device is governed by the geometric space limitations in the eye, consistent with comfortable retention of the ocular insert. Satisfactory results can be obtained with an ocular device for insertion in the sac of the eye of from 4 to 20 millimeters in length, 1 to 12 millimeters in width, and 0.1 to 2 millimeters in thickness. Several embodiments of these inserts are exemplified in FIGS. 3 and 4.

Figure 3:
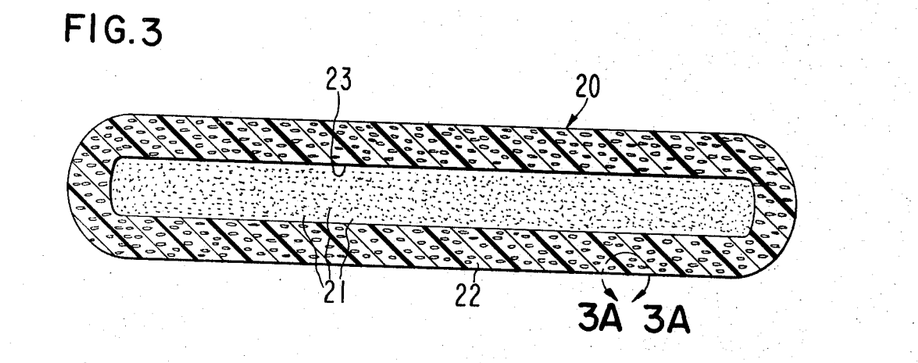
FIG. 3 illustrates a cross-sectional view of one embodiment of an ocular insert of this invention.
Figure 3A:
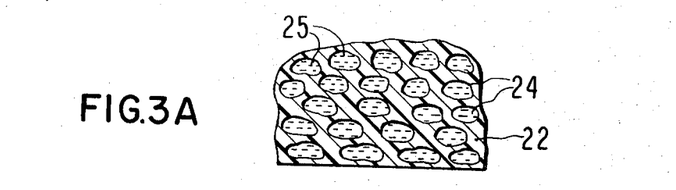
FIG. 3A is an enlarged fragmentary section of the rate controlling material of the ocular insert of FIG. 3 taken along line A—A of FIG. 3 depicting the microporous structure.

Turning now to the other drawings which are examples of various drug delivery devices of the invention, and which examples are not to be construed as limiting, one embodiment of a novel ocular delivery device is indicated in FIGS. 3 and 3A. FIGS. 3 and 3A illustrate generally by reference numeral 20 an ocular device of this invention having an elliptical marginal outline, oval in cross-section, comprising a rate controlling microporous barrier or membrane 22 surrounding and thereby defining inner container or reservoir 23 having drug formulation 21 confined therein. In operation drug 21 dissolves in diffusive medium 25 located in pore 24 and migrates through the filled pore at a controlled and reproducible rate and is thereafer transported to the eye and surrounding tissues. Diffusive medium 25 functions to control the rate of release of drug. An important advantage of the design of the device depicted in FIG. 3 is that it is adapted to give a zero order rate of drug release, i.e., a rate which is constant with time. Material 22 can have uniform properties over its entire dimensions or can be imperforate in part, wherein membrane 22 is solid and non-permeable to drug along, for example, the face in contact with the conjunctiva of the lid. Reservoir 23 primarily functions as a depot for drug 21. Drug 21 can be formulated in a carrier which is liquid, solid, semi-solid or the like, as described hereinafter. It is preferred, when desired to obtain a zero order rate of drug release, that the drug be incorporated in a carrier material in which the drug is only "sparingly soluble" so as to retain substantially the same thermodynamic activity of the drug throughout the release period. By "sparingly soluble" is meant that the fractional amount of drug dissolved in the reservoir carrier material should be in range of from 0.1 to 35 percent by weight of the total amount of drug to be delivered, such that particles of undissolved drug are present throughout most of the drug release period. Moreover, for best results, the rate of passage of drug through membrane 22 should not exceed the rate of removal or clearance of drug from the exterior of the membrane by eye tissues. This insures that the drug delivery rate is controlled by diffusion through the membrane 22, which can be controlled.

Figure 4:
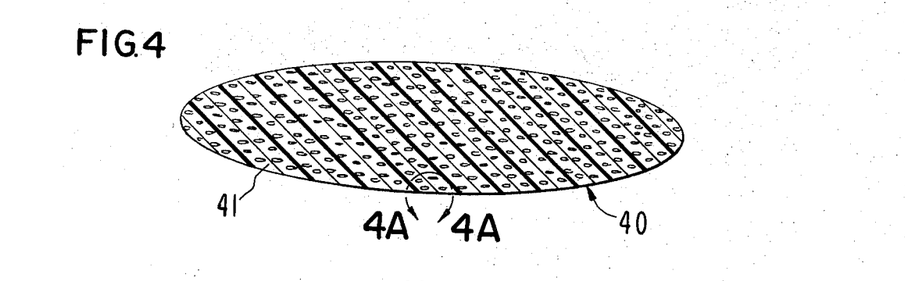
FIG. 4 is a cross-sectional view illustrating another embodiment of an ocular insert of this invention.
Figure 4A:
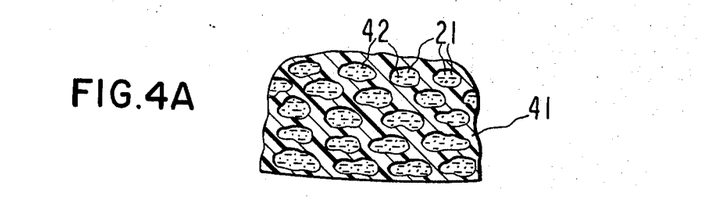
FIG. 4A is an enlarged fragmentary section of the rate controlling material of the ocular insert of FIG. 4 taken along line A—A of FIG. 4 depicting the microporous structure.

FIGS. 4 and 4A illustrate another embodiment of the ocular insert of the invention wherein the device 40 is comprised of a body of microporous drug release rate controlling matrix material 41 having drug formulation 21 dispersed therethrough. The matrix material 41 functions both as a drug reservoir source and rate release controlling material to continuously dispense a metered amount of drug to the eye and surrounding tissues over a prolonged period of time through diffusive permeation through filled pore 42.

Thus, it can be seen from the aforesaid description that the drug release rate controlling material can be of the barrier or membrane type, for example, as shown in FIG. 3 or of the matrix type, for example, as shown in FIG. 4.

The ocular insert is intended to provide a complete dosage regimen for eye therapy over this prolonged period. Therefore, the amount of drug to be incorporated in the device is determined by the fact that sufficient amounts of drug must be present to maintain the desired dosage level over the therapeutic treatment period. Typically, from 1 microgram to 0.25 gram, or larger, of drug is incorporated in the ocular insert, the exact amount of course depending upon the drug used and treatment period. Illustratively, in order to treat infection in an adult human, the daily release dosage should be in the range of between 25 micrograms to 1,000 micrograms of hydrocortisone acetate per day. Thus, for example, using hydrocortisone acetate with a devide intended to remain in place for 7 days, and with a release rate of 500 micrograms of drug per day, 3.5 milligrams of the drug will be incorporated in the device. Other devices containing different amounts of drug for use for different time periods and releasing drug at higher or lower controlled rates are also readily made by the invention.

Further, in practicing this invention one can employ any of the hereinafter mentioned listed drugs, consistent with their known dosages and uses, to establish a release rate, e.g., micrograms/insert/day. Exemplary of the dosages to be used are:

| | |
|---|---|
| Antibiotics, such as polymixin: | 250 micrograms/insert/day |
| Sulfonamides, such as sulfacetamide: | 500 micrograms/insert/day |
| Antivirals, such as idoxuridine: | 5 micrograms/insert/day |

-Continued

Anti-inflammatories,
such as hydrocortisone
acetate or prednisolone:        500 micrograms/insert/day Suitable drugs for use in therapy of the eye with the ocular insert of this invention, consistent with their known dosages and uses, are, without limitation: antibiotics such as tetracycline, chlortetracycline, bacitracin, neomycin, polymyxin, gramicidin, oxytetracycline, chloramphenicol, gentamycin, and erythromycin; antibacterials such as sulfonamides, sulfacetamide, sulfamethizole and sulfisoxazole; antivirals, including idoxuridine; and other antibacterial agents such as nitrofurazone and sodium propionate; anti-allergenics such as antazoline, methapyriline, chlorpheniramine, pyrilamine and prophenpyridamine; anti-inflammatories such as hydrocortisone, hydrcortisone acetate, dexamethasone, dexamethasone 21-phosphate, fluocinolone, medrysone, prednisolone, methylprednisolone, prednisolone 21-phosphate, prednisolone acetate, fluorometholone, betamethasone and triamcinolone; decongestants such as phenylephrine, naphazoline, and tetrahydrazoline; miotics and anticholinesterases such as pilocarpine, eserine salicylate, carbachol, diisopropyl fluorophosphate, phospholine iodide, and demecarium bromide; mydriatics such as atropine sulfate, cyclopentolate, homatropine, scopolamine, tropicamide, eucatropine, and hydroxyamphetamine; and sympathomimetics such as epinephrine.

Drugs can be in various forms, such as uncharged molecules, components of molecular complexes, or nonirritating, pharmacologically acceptable salts such as hydrochloride, hydrobromide, sulfate, phosphate, nitrate, borate, acetate, maleate, tartrate, salicylate, etc. For acidic drugs, salts of metals, amines, or organic cations (e.g., quaternary ammonium) can be employed. Furthermore, simple derivatives of the drugs such as ethers, esters, amides, etc. which have desirable retention, release or solubility characteristics, but which are easily hydrolized by body pH, enzymes, etc., can be employed. The amount of drug incorporated in the ocular insert varies widely depending on the particular drug, the desired therapeutic effect, and the time span for which the ocular insert will be used.

As previously indicated, the release rate of drug from the device is dependent upon the drug solubility in the diffusive medium. In cases wherein the solubility in the medium, e.g., tear fluid, is greater than desired in order to obtain the desired release rate, it is preferred in these cases that certain modifications be made to insolubilize the drug. Insolubilization of the drug can be accomplished in a number of ways, among which include the forming of pharmaceutically acceptable derivatives of the drug which are not water soluble. These derivatives can be prepared by art known techniques and then used in the practice of the invention. Of course, the drug derivative should be such as to convert to the active drug within the body through the action of body enzymes, assisted transformations, pH, specific organ activities, and the like.

The solubility of a drug in a given diffusive medium can be determined by various art known techniques. One method consists in preparing a solution of the given drug and ascertaining by analysis the amount of drug present in a definite quantity. A simple apparatus for this purpose consists of a test tube of medium size fastened upright in a water bath maintained at constant temperature. The medium and drug are placed in the tube and stirred by means of a motor driven rotating glass spiral. After a given period of stirring, a definite weight of the medium is analyzed and the stirring continued for an additional period of time. If the analysis shows no increase of dissolved substance after the second period of stirring, the results are taken as the degree of solubility of the drug in the medium. Numerous other methods are available for the determination of the degree of solubility of a drug in a liquid medium. Typical methods used for the measurement of solubility are chemical analysis, measurement of density, refractive index, electrical conductivity, and the like. Details of various methods for determining solubilities are described in United States Public Health Service Bulletin No. 67 of the Hygienic Laboratory; *Encyclopedia of Science and Technology*, Vol. 12, pages 542 to 556, 1971, McGraw Hill, Inc.; *Encyclopaedic Dictionary of Physics*, Vol. 6, pages 545 to 557, 1962, Pergamon Press, Inc.; and the like.

The above drugs and other drugs can be present in the reservoir alone or in combination form with pharmaceutical carriers. The pharmaceutical carriers acceptable for the purpose of this invention are the art known carriers that do not adversely affect the drug, the host, or the material comprising the drug delivery device. Suitable pharmaceutical carriers include solids such as starch, gelatin, sugars, e.g., glucose, natural gums, e.g., acacia, sodium alginate, carboxymethyl cellulose, polymers, e.g., silicone rubber; liquids such as sterile water, saline, dextrose, dextrose in water or saline; condensation products of castor oil and ethylene oxide combining about 30 to about 35 moles of ethylene oxide per mole of castor oil; liquid glyceryl triester of a lower molecular weight fatty acid; lower alkanols; oils such as corn oil, peanut oil, sesame oil, and the like, with emulsifiers such as mono- or di-glyceride of a fatty acid, or a phosphatide, e.g., lecithin, and the like; glycols; polyalkylene glycols; aqueous media in the presence of a suspending agent, for example, sodium carboxymethylcellulose, sodium alginate, poly(vinylpyrrolidone), and the like, alone, or with suitable dispensing agents such as lecithin, polyoxyethylene stearate, and the like. The carrier may also contain adjuvants such as preserving, stabilizing, wetting, emulsifying agents, and the like.

It is preferred that the diffusive medium, when other than tear fluid, also be incorporated in the reservoir in combination with the drug in the form of a pharmaceutically acceptable carrier.

The rate of release of drug through the medium filled pores or stagnant rate controlling layer can be readily determined by those skilled in the art; standard techniques are described in *Encyl. Polymer Science and Technology*, Vols. 5 and 9, Pages 65 to 85 and 795 to 807, 1968; and the references cited therein. One applicable method employs Fick's Law, wherein the flux of drug through a convection-free liquid in a porous membrane is given by the equation:

$$J = -\epsilon\, D/Y\, (dc/d\chi)$$

wherein
 "$J$" is the flux in $gm/cm^2$ − sec
 "$\epsilon$" is the porosity − $cm^3/cm^3$
 "$Y$" is the tortuosity factor "$D$" is the diffusion coefficient cm²/sec "$dc/d\chi$" is the drug concentration gradient across the barrier.

If we assume the diffusion coefficient to be independent of concentration, and the concentration of drug at the outside surface is negligibly small, we may write:

$$J = (\epsilon D/Y)(C_s/l)$$

wherein

"$C_s$" is the saturation solubility of the drug in the diffusive medium; and

"$l$" is the barrier thickness.

The diffusion coefficient "$D$" will be in the order of $2 \times 10^{-6}$ cm² sec⁻¹ when the drug has a small molecular diameter, e.g., about 10°A and the pore diameter of the microporous matrix is large in comparison with the molecular drug diameter, i.e., at least greater by a factor of 10. However, when the pore diameter of the rate controlling membrane is reduced relative to that of the molecular drug diameter to, for example, from 10 to about 3 times the molecular diameter, the diffusion coefficient "$D$" will decrease to values as low as $2 \times 10^{-8}$ cm²–sec⁻¹. Ratios of membrane pore diameter to molecular drug diameter significantly below ca 3 are considered to be homogenous solution diffusion materials. Thus, by varying pore diameter or porosity of the microporous materials, substantial changes in drug release rate can be brought about while still using the same materials.

Figure 5:
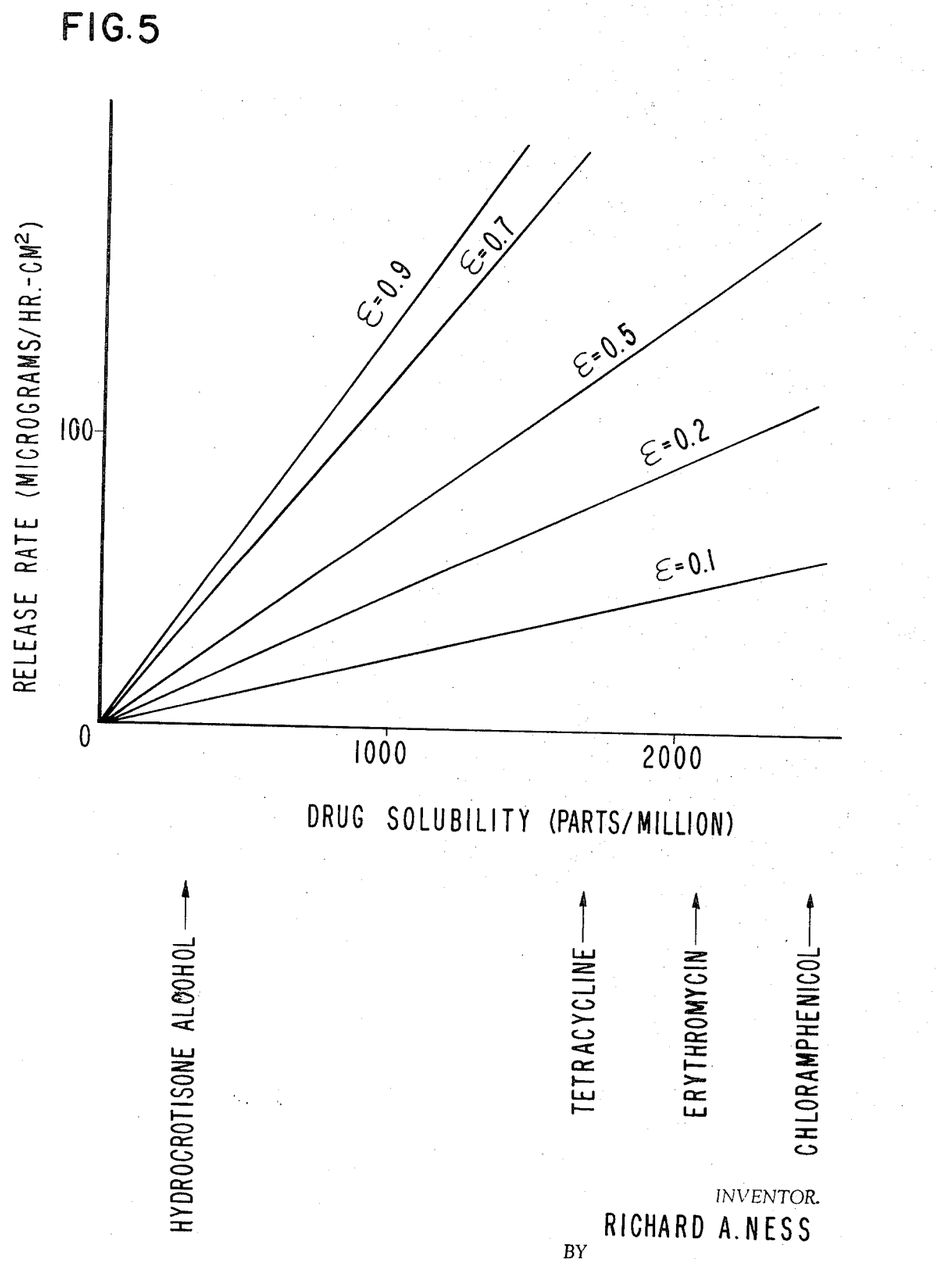
FIG. 5 is a graph illustrating how drug release rate varies with drug solubility at a variety of selected porosities.

Using equation (1) above and for an ocular device of the type illustrated in FIG. 3, having an area of 1 cm², and fabricated from a material with an assumed tortuosity of 3, thickness of $1 \times 10^{-2}$ cm, and a drug diffusion coefficient of $2 \times 10^{-6}$ cm² sec⁻¹, a graph has been prepared, identified as FIG. 5, illustrating the variation in release rate with drug solubility for selected porosities. It will be apparent that the range illustrated in the graph can be extended to other values of porosity and drug solubility and for other drugs and tortuosities than those depicted.

Drug can be incorporated in the ocular insert in many ways. When the ocular insert is in the form of a container, any of the encapsulation, bonding, and coating techniques conventionally used in the art can be employed. When the ocular insert is a matrix with the drug dispersed therethrough, it can be fabricated by adding the drug to the matrix materials prior to forming the microporous structure or by impregnating the material with drug after shaping to the form of the ocular insert.

Insertion of the insert 12 into the eye can be satisfactorily accomplished by mounting or grasping the device by means of a suitable holder, which optionally may include a minute suction cup for engaging the outer surface of the insert. The holder may be one of the several types commonly used to insert and remove corneal contact lenses, artificial eyes, and the like. Further, the present invention contemplates the use of an indicator dye in the drug or material of the insert, or both, to serve as a visual indication as to the supply of drug within the device or the device itself in the eye. For this purpose, a small amount of methylene blue or any suitable dye material can be used.

In an example of the manufacture of an ocular insert of the invention, liquid polydimethylsiloxane (Dow Corning Silastic 382) is mixed with 2,000 micrograms of hydrocortisone alcohol. After uniformly mixing the drug with the unvulcanized silicone rubber, stannous octoate catalyst (0.5 percent by weight) is added and the mixture is poured into a mold having an ellipsoidal cavity 6 millimeters by 4 millimeters by 0.5 millimeter to cure the silicone rubber at room temperature. A cellulose acetate membrane is bonded around the external face surfaces of the rubber. The membrane is characterized by a porosity of 60 percent, a pore size of 0.45 micron and a thickness of 4 mils. When inserted in the cul-de-sac of the conjunctiva between the sclera of the eyeball and the lower lid, the ocular insert is effective to deliver at a controlled rate a therapeutically effective does of drug to the eye required for 24 hours of treatment of infection. After that period of time, the ocular insert, with its dimensions unchanged, is removed from the cul-de-sac and an identical insert placed in its stead to continue the therapeutic program for an additional 24 hour period.

Thus, the ocular device of this invention employs a metering system which facilitates the obtainment of precisely controlled drug release rates. While there have been described and pointed out the fundamental novel features of the invention as applied to the preferred embodiments, those skilled in the art will appreciate that various modifications, changes, and omissions in the ocular insert illustrated and described can be made without departing from the spirit of the invention. It is the intention, therefore, to be limited only by the scope of the following claims.

What is claimed is:

1. An ocular device for the controlled and continuous administration of a predetermined dosage of drug to the eye over a prolonged period of time comprising a body of a polymeric microporous drug release rate controlling material which is insoluble in tear fluid, the pores of which are filled with a liquid or gel medium permeable to the passage of drug by diffusion, the body containing a reservoir of drug formulation confined therein which is of limited solubility in the medium such that the passage of drug through the medium is less than its rate of clearance from the exterior of the body and being of a shape which is adapted for insertion and retention in the sac of the eye bounded by the surfaces of the bulbar conjunctiva of the sclera of the eyeball and the palpebral conjunctiva of the lid, the body continuously metering the flow of a therapeutically effective amount of drug to the eye and surrounding tissues over a prolonged period of time at a rate determined by the rate of diffusion of drug in the diffusive medium and wherein the body is a sealed container, the walls of which are formed from the microporous release rate controlling material and define an interior chamber distinct from the pores of said material, said chamber forming said reservoir.

2. The ocular device of claim 1, wherein the body is a matrix of microporous release rate controlling material having the drug formulation distributed therethrough.

3. The ocular device of claim 1, wherein the drug formulation comprises a drug in a solid carrier material.

4. The ocular device of claim 1, wherein the drug formulation comprises a drug in a liquid carrier material.

5. The ocular device of claim 3, wherein the drug is sparingly soluble in the carrier material.

6. The ocular device of claim 4, wherein the drug is sparingly soluble in the carrier material.

7. The ocular device of claim 1, wherein the diffusive medium is lacrimal fluid.

8. The ocular device of claim 1, wherein the drug solubility in the diffusive medium is from 10 to 5,000 parts per million.

9. The ocular device of claim 1, wherein the microporous material has an effective pore size of from 10 angstroms to 100 microns and a porosity of from 5 percent to 95 percent.

* * * * *